US012051360B2

(12) United States Patent
Kim et al.

(10) Patent No.: US 12,051,360 B2
(45) Date of Patent: Jul. 30, 2024

(54) DISPLAY DEVICE AND DRIVING METHOD OF THE SAME

(71) Applicant: Samsung Display Co., Ltd., Yongin-si (KR)

(72) Inventors: Dowon Kim, Gwacheon-si (KR); Min-Weun Kim, Seoul (KR); Sung-Yeol Baek, Anyang-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 5 days.

(21) Appl. No.: 18/099,534

(22) Filed: Jan. 20, 2023

(65) Prior Publication Data

US 2023/0316991 A1 Oct. 5, 2023

(30) Foreign Application Priority Data

Apr. 4, 2022 (KR) ........................ 10-2022-0041491

(51) Int. Cl.
*G09G 3/32* (2016.01)

(52) U.S. Cl.
CPC ......... *G09G 3/32* (2013.01); *G09G 2310/027* (2013.01); *G09G 2320/0233* (2013.01); *G09G 2320/0276* (2013.01)

(58) Field of Classification Search
CPC ............... G09G 3/32; G09G 2310/027; G09G 2320/0233; G09G 2320/0276; G09G 2320/0673; G09G 3/3233; G09G 5/10; G09G 2320/0626; G09G 2330/028; G09G 2320/0271
See application file for complete search history.

(56) References Cited

U.S. PATENT DOCUMENTS

| | | | |
|---|---|---|---|
| 7,623,141 B2 | 11/2009 | Brown Elliott et al. | |
| 11,244,612 B2 | 2/2022 | Ok et al. | |
| 2015/0015618 A1* | 1/2015 | Song .................... | G09G 3/3208 345/690 |
| 2020/0335045 A1 | 10/2020 | Jeong et al. | |
| 2021/0110752 A1 | 4/2021 | Kim et al. | |

FOREIGN PATENT DOCUMENTS

| | | |
|---|---|---|
| KR | 100923053 B1 | 10/2009 |
| KR | 1020200123694 A | 10/2020 |
| KR | 1020200134584 A | 12/2020 |

* cited by examiner

*Primary Examiner* — Matthew A Eason
*Assistant Examiner* — Chayce R Bibbee
(74) *Attorney, Agent, or Firm* — CANTOR COLBURN LLP

(57) ABSTRACT

A display device includes a luminance correction unit that corrects input data based on a dimming code value and outputs correction data, a gamma correction unit that corrects the correction data and generates output data, a gamma voltage generator that generates gamma voltages depending on a first voltage code value, a data driver that converts the output data into data voltages based on the gamma voltages, and a controller that supplies the dimming code value and the input data to the luminance correction unit and provides the first voltage code value to the gamma voltage generator. The controller compares a highest dimming compares a highest dimming grayscale value of the output data determined by the dimming code value with a highest reference grayscale value and updates the first voltage code value with a second voltage code value.

20 Claims, 12 Drawing Sheets

DISPLAY DEVICE AND DRIVING METHOD OF THE SAME

This application claims priority to Korean Patent Application No. 10-2022-0041491, filed on Apr. 4, 2022, and all the benefits accruing therefrom under 35 U.S.C. § 119, the content of which in its entirety is herein incorporated by reference.

BACKGROUND

1. Field

Embodiments of the disclosure described herein relate to a display device and a driving method of the display device, and more particularly, relate to a display device and a driving method of the display device capable of improving display quality.

2. Description of the Related Art

A display device includes a display panel and a panel driver. The display panel includes scan lines, data lines, and pixels. The panel driver includes a scan driver providing a scan signal to a corresponding scan line of the scan lines and a data driver providing a data signal to a corresponding data line of the data lines. A pixel of the pixels may emit light with a luminance corresponding to the data signal (e.g., data voltage) provided through the corresponding data line in response to the scan signal provided through the corresponding scan line.

The data driver may convert receiving data into data voltages having a grayscale value using gamma voltages corresponding to a plurality of grayscales.

SUMMARY

Embodiments of the disclosure provide a display device and a driving method of the display device for alleviating an issue in which display quality is deteriorated after dimming.

In an embodiment of the disclosure, a display device includes a luminance correction unit that corrects input data based on a dimming code value and outputs correction data, a gamma correction unit that corrects the correction data to correspond to a reference gamma using a gamma lookup table and generates output data, a gamma voltage generator that generates a plurality of gamma voltages depending on a first voltage code value, and a data driver that converts the output data into data voltages based on the plurality of gamma voltages, a controller that supplies the dimming code value and the input data to the luminance correction unit, provides the first voltage code value to the gamma voltage generator, and controls driving of the data driver. The controller compares a highest dimming grayscale value of the output data determined by the dimming code value with a preset highest reference grayscale value, and updates the first voltage code value with a second voltage code value.

In an embodiment of the disclosure, a driving method of a display device includes correcting input data based on a dimming code value to output correction data, correcting the correction data to correspond to a reference gamma using a gamma lookup table to generate output data, comparing a highest dimming grayscale value of the output data determined by the dimming code value with a preset highest reference grayscale value, determining whether to update a first voltage code value with a second voltage code value depending on a comparison result, generating a plurality of gamma voltages based on the first voltage code value or the second voltage code value, and converting the output data into data voltages based on the plurality of gamma voltages and providing the converted data voltages to a display panel.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
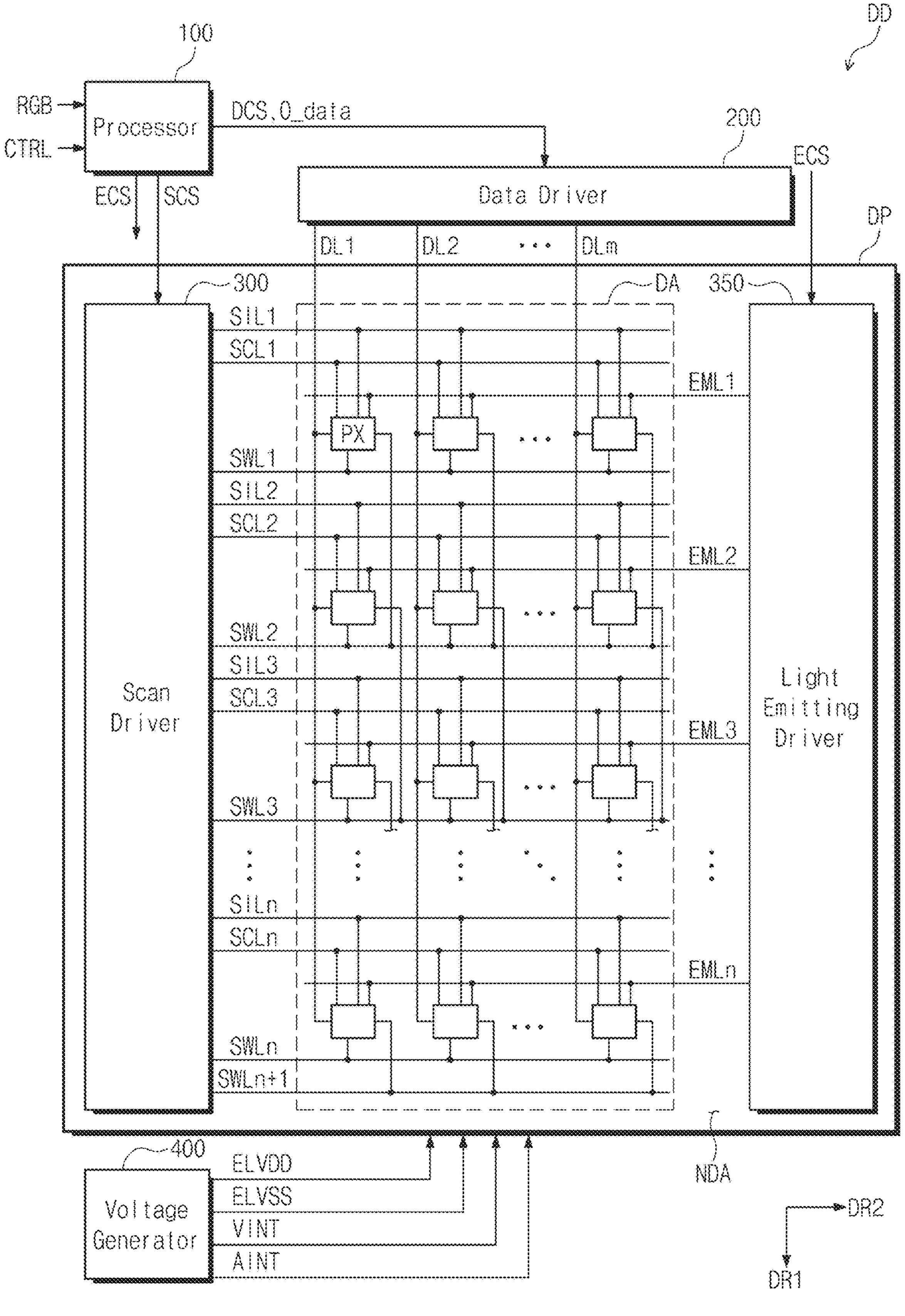
FIG. 1 is a block diagram of an embodiment of a display device, according to the disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

The term such as "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the disclosure.

Hereinafter, embodiments of the disclosure will be described with reference to accompanying drawings.

Figure 2A:
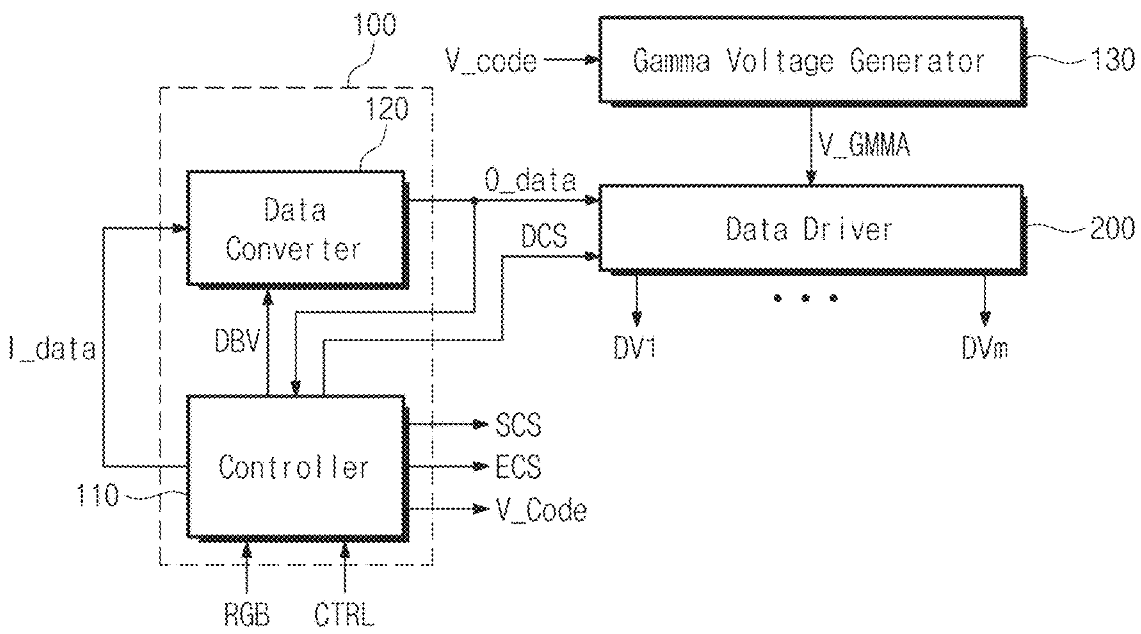
FIG. 2A is an internal block diagram of a processor illustrated in FIG. 1.
Figure 2B:
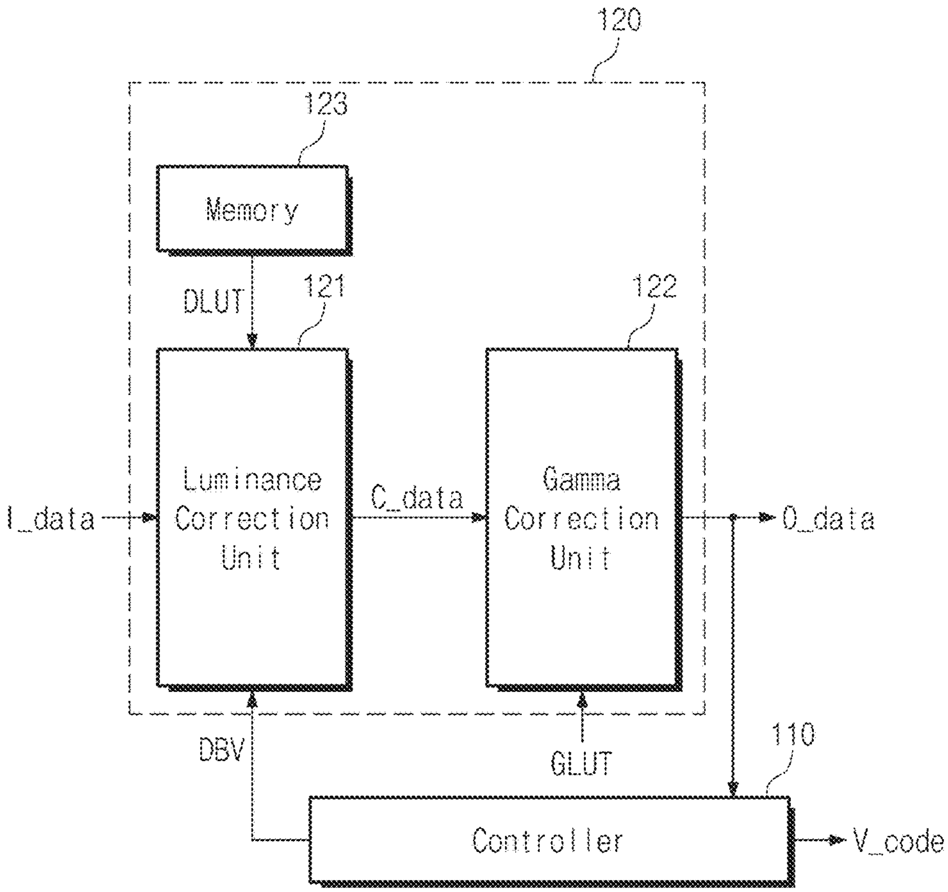
FIG. 2B is an internal block diagram of a data converter illustrated in FIG. 2A.

FIG. 1 is a block diagram of an embodiment of a display device, according to the disclosure. FIG. 2A is an internal block diagram of a processor illustrated in FIG. 1, and FIG. 2B is an internal block diagram of a data converter illustrated in FIG. 2A.

Referring to FIGS. 1 and 2A, a display device DD includes a display panel DP, a panel driver for driving the display panel DP, and a processor 100 for controlling an operation of the panel driver. In an embodiment of the disclosure, the panel driver includes a data driver 200, a scan driver 300, a light-emitting driver 350, and a voltage generator 400.

The processor 100 receives an input image signal RGB and a control signal CTRL. The processor 100 generates output data O_data obtained by converting a data format of the input image signals RGB to meet the interface specification with the data driver 200. The processor 100 generates a first driving control signal SCS, a second driving control signal DCS, and a third driving control signal ECS, based on the control signal CTRL.

The data driver 200 receives the second driving control signal DCS and the output data O_data from the processor 100. The data driver 200 converts the output data O_data into data voltages and outputs the data voltages to a plurality of data lines DL1 to DLm (m is a natural number) to be described later. The data voltages are analog voltages corresponding to the grayscale values of the output data O_data.

The scan driver 300 receives the first driving control signal SCS from the processor 100. The scan driver 300 may output scan signals to scan lines in response to the first driving control signal SCS.

The voltage generator 400 generates voltages desired for an operation of the display panel DP. In an embodiment, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, emission control lines EML1 to EMLn, the data lines DL1 to DLm, and pixels PX. Here, n is a natural number. Although not illustrated in the drawings, the display panel DP may further include black scan lines. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may be disposed in a display area DA. The data lines DL1 to DLm extend in a first direction DR1 and are arranged to be spaced apart from each other in a second direction DR2. The initialization scan lines SIL1 to SILn, the compensation scan lines SCL1 to SCLn, the write scan lines SWL1 to SWLn+1, and the emission control lines EML1 to EMLn extend in the second direction DR2. The initialization scan lines SIL1 to SILn, the compensation scan lines SCL1 to SCLn, the write scan lines SWL1 to SWLn+1, and the emission control lines EML1 to EMLn are arranged to be spaced apart from each other in the first direction DR1.

The plurality of pixels PX is electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm, respectively. Each of the plurality of pixels PX may be electrically connected to four scan lines. In an embodiment, the pixels PX of a first row may be connected to the first initialization scan line SILL the first compensation scan line SCL1, the first write scan line SWL1, and the second write scan line SWL2, for example. Also, the pixels PX of a second row may be connected to the second initialization scan line SIL2, the second compensation scan line SCL2, and the second and third write scan lines SWL2 and SWL3.

The scan driver 300 may be disposed in a non-display area NDA of the display panel DP. The scan driver 300 may output initialization scan signals to the initialization scan lines SIL1 to SILn and may output write scan signals to the write scan lines SWL1 to SWLn+1, in response to the first driving control signal SCS provided from the processor 100. Also, the scan driver 300 may output compensation scan signals to the compensation scan lines SCL1 to SCLn in response to the first driving control signal SCS.

The light-emitting driver 350 receives the third driving control signal ECS from the processor 100. The light-emitting driver 350 may output light emission control signals to the emission control lines EML1 to EMLn in response to the third driving control signal ECS.

In another embodiment, the scan driver 300 may be connected to the emission control lines EML1 to EMLn. In this case, the scan driver 300 may output the light emission control signals to the emission control lines EML1 to EMLn.

Each of the plurality of pixels PX includes a light-emitting device ED (refer to FIG. 9) and a pixel circuit PXC (refer to FIG. 9) for controlling the light emission of the light-emitting device ED. The pixel circuit PXC may include a plurality of transistors and a capacitor. The scan driver 300 and the light-emitting driver 350 may include transistors formed through the same process as the pixel circuit PXC.

Each of the plurality of pixels PX receives the first driving voltage ELVDD, the second driving voltage ELVSS, the first initialization voltage VINT, and the second initialization voltage AINT from the voltage generator 400.

Referring to FIGS. 2A and 2B, the processor 100 may include a controller 110, a data converter 120, and a gamma voltage generator 130. The controller 110 receives the input image signals RGB and the control signal CTRL. The input image signals RGB may include a red image signal, a green image signal, and a blue image signal. However, the disclosure is not limited thereto, and the input image signals RGB may include various other color image signals The processor 100 generates input data I_data obtained by converting a data format of the input image signals RGB to meet the interface specification with the data driver 200. The generated input data I_data are provided to the data converter 120.

The controller 110 generates the first driving control signal SCS, the second driving control signal DCS, and the third driving control signal ECS, based on the control signal CTRL. The first driving control signal SCS, the second driving control signal DCS, and the third driving control signal ECS may be supplied to the scan driver 300, the data driver 200, and the light-emitting driver 350, respectively.

The controller 110 may provide a preset current dimming code value DBV to the data converter 120. The current dimming code value DBV (hereinafter, also referred to as a dimming code value) may be a value set to enable the display device DD to display an image corresponding to a target luminance level. The dimming code value DBV may be one selected from among a plurality of dimming code values. In an embodiment of the disclosure, the dimming code value DBV may be a digital value, e.g., an 8-bit signal.

The data converter 120 may include a luminance correction unit 121, a gamma correction unit 122, and a memory 123. The luminance correction unit 121 corrects the input data I_data based on the dimming code value DBV and outputs correction data C_data.

The memory 123 may store dimming lookup tables corresponding to a plurality of dimming code values. The luminance correction unit 121 may select one of the dimming lookup tables based on the received dimming code value DBV and may generate dimming correction values for each grayscale based on a selected dimming lookup table DLUT. The luminance correction unit 121 may correct the input data I_data based on the dimming correction values for each grayscale to generate the correction data C_data.

The gamma correction unit 122 generates the output data O_data by correcting the correction data C_data to correspond to a reference gamma using a gamma lookup table GLUT. In an embodiment of the disclosure, the reference gamma may be 2.2 gamma. Gamma correction values corresponding to the reference gamma may be stored in the gamma lookup table GLUT. The gamma correction unit 122 may gamma-correct the correction data C_data using the gamma correction values. The gamma correction unit 122 may output the output data O_data generated through the gamma correction to the data driver 200. In an embodiment of the disclosure, the output data O_data may include red output data, green output data, and blue output data. However, the disclosure is not limited thereto, and the output data O_data may include various other color output data.

The gamma voltage generator 130 may generate a plurality of gamma voltages V_GMMA depending on a voltage code value V_code supplied from the controller 110. The gamma voltage generator 130 may output the plurality of gamma voltages V_GMMA to the data driver 200.

The gamma voltage generator 130 may determine voltage levels of a first gamma reference voltage (or a bottom reference voltage) and a second gamma reference voltage (or a top reference voltage) according to the voltage code value V_code. The voltage code value V_code may include a bottom voltage code value determining a voltage level of the first gamma reference voltage and a top voltage code value determining a voltage level of the second gamma reference voltage. In an embodiment of the disclosure, the voltage code value V_code may be a digital value.

A voltage level of each of the plurality of gamma voltages V_GMMA may be determined by the first gamma reference voltage and the second gamma reference voltage. In an embodiment, each of the plurality of gamma voltages V_GMMA may have a voltage level greater than or equal to the first gamma reference voltage and less than or equal to the second gamma reference voltage, for example.

The data driver 200 converts the output data O_data to data voltages DV1 to DVm based on the plurality of gamma voltages V_GMMA, and may provide the data voltages DV1 to DVm to the data lines DL1 to DLm (refer to FIG. 1) of the display panel DP (refer to FIG. 1).

Figure 3A:
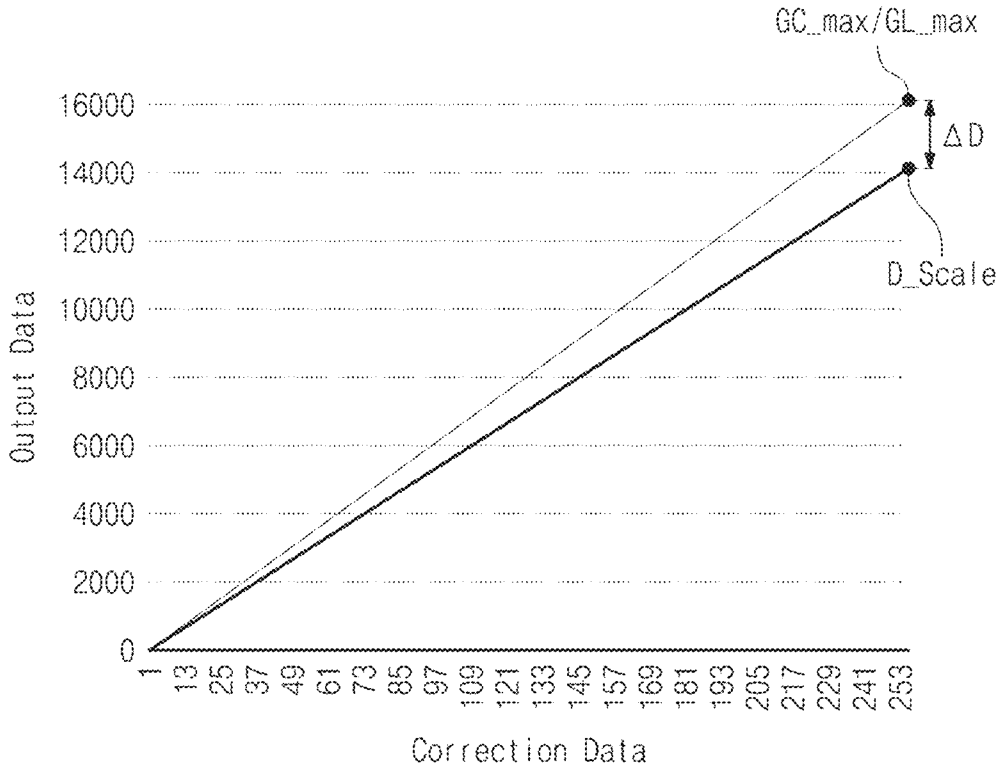
FIG. 3A is a graph illustrating a relationship between correction data and output data, according to a dimming code value.
Figure 3B:
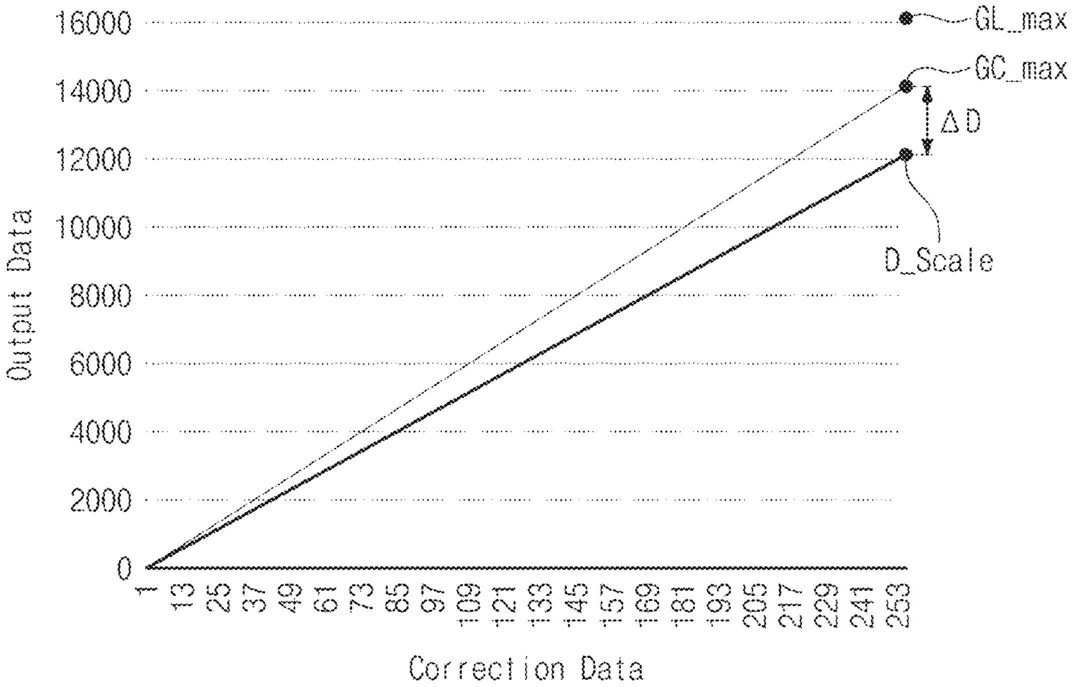
FIG. 3B is a graph illustrating a relationship between correction data and output data, according to a dimming code value.

FIG. 3A is a graph illustrating a relationship between correction data and output data, according to a dimming code value, and FIG. 3B is a graph illustrating a relationship between correction data and output data, according to a dimming code value.

Referring to FIGS. 2A, 2B, 3A, and 3B, the controller 110 may compare a highest dimming grayscale value (or a dimming scale value D_scale) of the output data O_data after dimming with a highest grayscale value (hereinafter, also referred to as a highest reference grayscale value GC_max) of the output data O_data before dimming, and may update the voltage code value V_code (e.g., the bottom voltage code value). The highest dimming grayscale value D_scale may be defined as the highest grayscale value of the output data O_data that may be expressed based on the dimming code value DBV. The highest reference grayscale value GC_max may be defined as the highest dimming grayscale value that may be expressed by the output data O_data before dimming (or determined by the highest dimming code value among the plurality of dimming code values). In an embodiment, when the number of bits of the output data O_data is 'n', the highest reference grayscale value GC_max may be less than or equal to 2n. Here, 'n' may be an integer of 1 or more, for example. That is, the highest reference grayscale value GC_max may be less than or equal to a highest grayscale value GL_max that may be expressed by the gamma lookup table GLUT. When the number of bits of the output data O_data is 'n', the highest gray scale value of the gamma lookup table GLUT may be 2n.

The controller 110 determines whether to update the voltage code value V_code by determining whether a deviation ΔD between the highest dimming grayscale value D_scale and the highest reference grayscale value GC_max is greater than a preset reference deviation. In detail, the controller 110 updates the voltage code value V_code when the deviation ΔD between the highest dimming grayscale value D_scale and the highest reference grayscale value GC_max is greater than the reference deviation, and maintains the voltage code value V_code when the deviation ΔD between the highest dimming grayscale value D_scale and the highest reference grayscale value GC_max is less than or equal to the reference deviation. Here, the voltage code value V_code before the update may be also referred to as a first voltage code value, and the voltage code value V_code after the update may be also referred to as a second voltage code value.

In an embodiment of the disclosure, a reference deviation R_bit (hereinafter, also referred to as a first reference deviation) is defined by Equation 1 below.

$$R\_bit=2^{n-m} \quad \text{[Equation 1]}$$

Here, 'n' is the number of bits of the output data O_data, and 'm' is the number of bits of the input data I_data.

However, the disclosure is not limited thereto. In an alternative embodiment, a reference deviation R_bit' (hereinafter, also referred to as a second reference deviation) may be defined by Equation 2 below.

$$R\_bit'=2^{n-m} \quad \text{[Equation 2]}$$

Here, 'n' is the number of bits of the output data O_data. That is, in this case, the second reference deviation R_bit' may be 1 bit.

In an embodiment of the disclosure, the highest dimming grayscale value D_scale may satisfy Equation 3 below.

$$D\_scale=GC\_max(DBV/M\_DBV)^{(1/R\_G)} \quad \text{[Equation 3]}$$

Here, GC_max may be the highest reference grayscale value of the gamma lookup table GLUT, DBV may be a dimming code value (i.e., a current dimming code value), M_DBV may be the highest dimming code value, and R_G may be a reference gamma. When the number of bits of the output data O_data is 'n', the highest reference grayscale value GC_max of the gamma lookup table GLUT may be less than or equal to 2n. The highest dimming code value M_DBV may be the highest value among the dimming code values. In an embodiment of the disclosure, the reference gamma R_G may be 2.2 gamma.

When the deviation between the highest dimming grayscale value D_scale and the highest reference grayscale value GC_max is greater than the reference deviation R_bit, the controller 110 may update the first voltage code value with the second voltage code value. Thereafter, the updated second voltage code value is provided to the gamma voltage generator 130, and the gamma voltage generator 130 adjusts the voltage level of the first gamma reference voltage (i.e., the bottom reference voltage) based on the second voltage code value. In an embodiment, when a first voltage code value is provided and the first gamma reference voltage has a voltage level of approximately 2.652 volts (V), the updated first gamma reference voltage may have a voltage level of about 3.409 V when the second voltage code value is provided, for example.

In an embodiment of the disclosure, the controller 110 may calculate a target reference voltage Vbot' to which the first gamma reference voltage Vbot is to be updated based on Equation 4 below.

$$Vbot'=\{[1-(GL\_max-D\_scale)]Vbot+(GC\_max-D\_scale)Vtop\}/[1-(GL\_max-GC\_max)] \quad \text{[Equation 4]}$$

Here, Vtop is the second gamma reference voltage, and GL_max is the highest grayscale value of the gamma lookup table GLUT. D_scale is the highest dimming grayscale value (i.e., dimming scale value) that the output data O_data may have after dimming based on the dimming code value DBV, and GC_max is the highest reference grayscale value that the output data O_data may have before dimming (or after dimming with the highest dimming code value).

Equation 4 may be derived from Equation 5 below indicating that a highest data voltage DV_max corresponding to the highest dimming grayscale value D_scale output from the data converter 120 after being corrected according to the dimming code value DBV is the same as the highest data voltage DV_max corresponding to the highest reference grayscale value GC_max before dimming (or after dimming with the highest dimming code value).

$$DV\_max=Vbot+(GL\_max-D\_scale)(Vtop-Vbot)=Vbot'+(GL\_max-GC\_max)(Vtop-Vbot') \quad \text{[Equation 5]}$$

The controller 110 may update the first voltage code value with the second voltage code value based on the calculated target reference voltage Vbot', and may provide the updated second voltage code value to the gamma voltage generator 130.

The gamma voltage generator 130 adjusts the voltage level of the first gamma reference voltage (i.e., the bottom reference voltage) depending on the updated second voltage code value. The gamma voltage generator 130 updates the plurality of gamma voltages V_GMMA based on the adjusted first gamma reference voltage. Accordingly, even when the grayscale of the output data O_data is lost due to the dimming code value DBV, since the data driver 200 generates the data voltages DV1 to DVm based on the updated plurality of gamma voltages V_GMMA, a grayscale loss greater than or equal to a preset reference value may not actually occur in the data voltages DV1 to DVm provided to the display panel DP.

According to Equations 1 and 2, while the second reference deviation R_bit' is fixed with 1 bit, the first reference deviation R_bit varies depending on 'n' and 'm', and is greater than the second reference deviation R_bit'. Accordingly, compared with the case of comparing the deviation ΔD between the highest dimming grayscale value D_scale and the highest reference grayscale value GC_max with the first reference deviation R_bit, the grayscale loss may be further reduced when the deviation ΔD is compared with the second reference deviation R_bit'.

Also, the gamma correction unit 122 may adjust the output data O_data by updating the gamma correction values of the gamma lookup table (also referred to as a gamma correction table) GLUT depending on the calculated target reference voltage Vbot'. Accordingly, the grayscale loss of the output data O_data due to the dimming code value DBV may be minimized.

Figure 4:
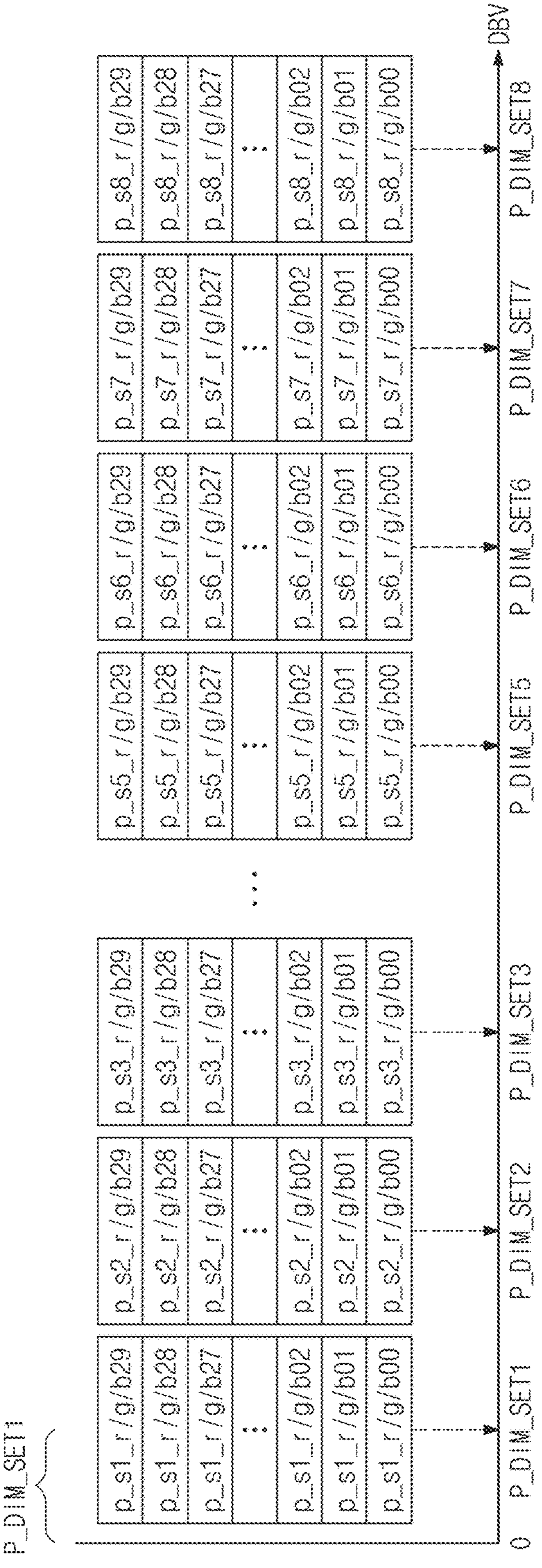
FIG. 4 is a diagram illustrating an embodiment of dimming lookup tables, according to the disclosure.

FIG. 4 is a diagram illustrating an embodiment of dimming lookup tables, according to the disclosure.

Referring to FIG. 4, dimming lookup tables P_DIM_SET1 to P_DIM_SET8 may be set with respect to predetermined dimming code values. In an embodiment, the first dimming lookup table P_DIM_SET1 is set to correspond to the first dimming code value, the second dimming lookup table P_DIM_SET2 is set to correspond to the second dimming code value, and the eighth dimming lookup table P_DIM_SET8 is set to correspond to the eighth dimming code value, for example. The dimming code values may be digital values set at a uniform interval or an irregular interval.

Only eight dimming lookup tables P_DIM_SET1 to P_DIM_SET8 are illustrated in FIG. 4, but the disclosure is not limited thereto. In an embodiment, the number of dimming lookup tables P_DIM_SET1 to P_DIM_SET8 may be 7 or less, or 9 or more, for example. Each of the dimming lookup tables P_DIM_SET1 to P_DIM_SET8 may include dimming correction values set to correspond to representative grayscale values, respectively. Here, the representative grayscale values may be arbitrarily set values among grayscale values included in an entire grayscale range that may be expressed by the input data I_data.

When the display device DD (refer to FIG. 1) is driven by the dimming driving method, luminance sag (i.e., a phenomenon in which light is emitted at a luminance lower than the target luminance, etc.) may occur, but the disclosure may compensate for such luminance sag. In the first dimming lookup table P_DIM_SET1, a first dimming correction value p_s1_r/g/b00 is a dimming correction value for a first representative grayscale value. The second dimming correction value p_s1_r/g/b01 may be a dimming correction value for a second representative grayscale value. That is, a k-th dimming correction value p_s1_r/g/bk (where ‘k’ is an integer greater than or equal to 0 and less than 30) may be a dimming correction value for a k-th representative grayscale value. In the second dimming lookup table P_DIM_SET2, the first dimming correction value p_s2_r/g/b00 may be a dimming correction value for the first representative grayscale value, and the second dimming correction value p_s2_r/g/b01 may be a dimming correction value for the second representative grayscale value. That is, the k-th dimming correction value p_s2_r/g/bk may be a correction value for the k-th representative grayscale value. In the eighth dimming lookup table P_DIM_SET8, the first dimming correction value p_s8_r/g/b00 may be a correction value for the first representative grayscale value, and the second dimming correction value p_s8_r/g/b01 may be a correction value for the second representative grayscale value. That is, the k-th dimming correction value p_s8_r/g/bk may be a correction value for the k-th representative grayscale value.

The luminance correction unit 121 (refer to FIG. 2B) may select a dimming lookup table corresponding to the dimming code value DBV from among the dimming lookup tables P_DIM_SET1 to P_DIM_SET8. The luminance correction unit 121 may generate an interpolated dimming lookup table by interpolating the dimming correction values stored in the selected dimming lookup table. The interpolated dimming lookup table may include dimming correction values for all grayscales. Accordingly, the luminance correction unit 121 may perform luminance correction based on the dimming correction value even when the input data I_data has a value other than the representative grayscale value.

Figure 5A:
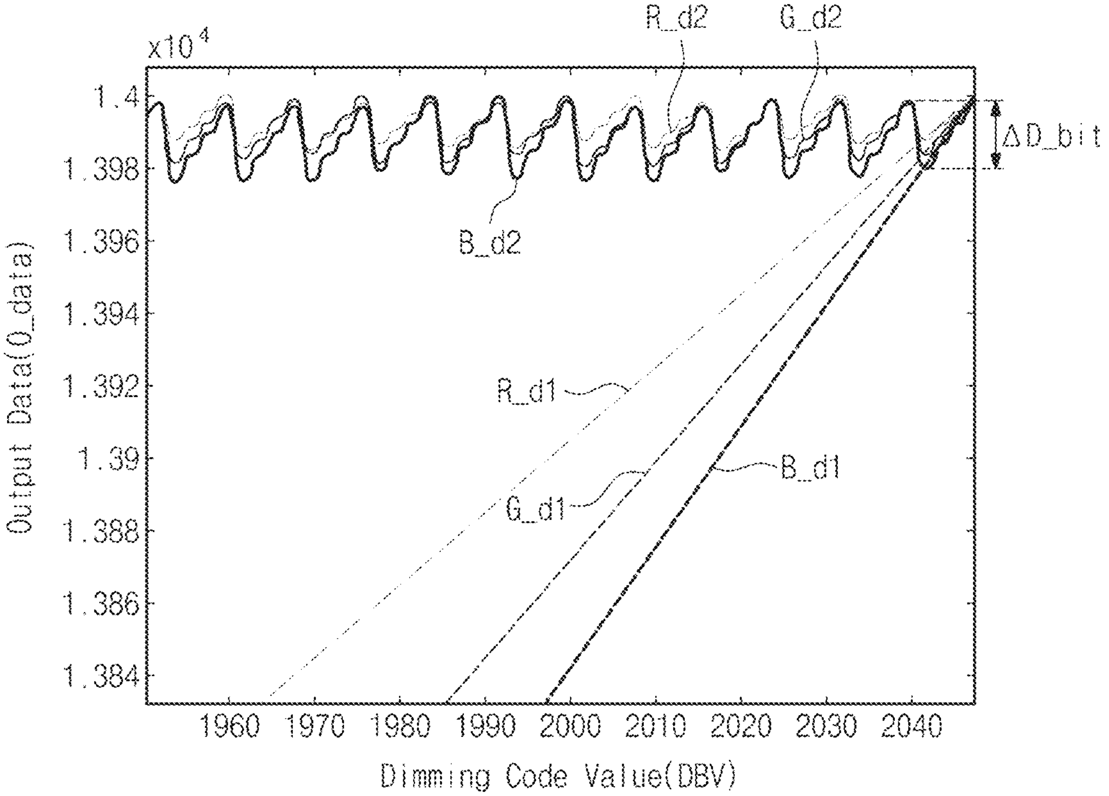
FIG. 5A is a graph illustrating a change in output data according to a dimming code value for each color.
Figure 5B:
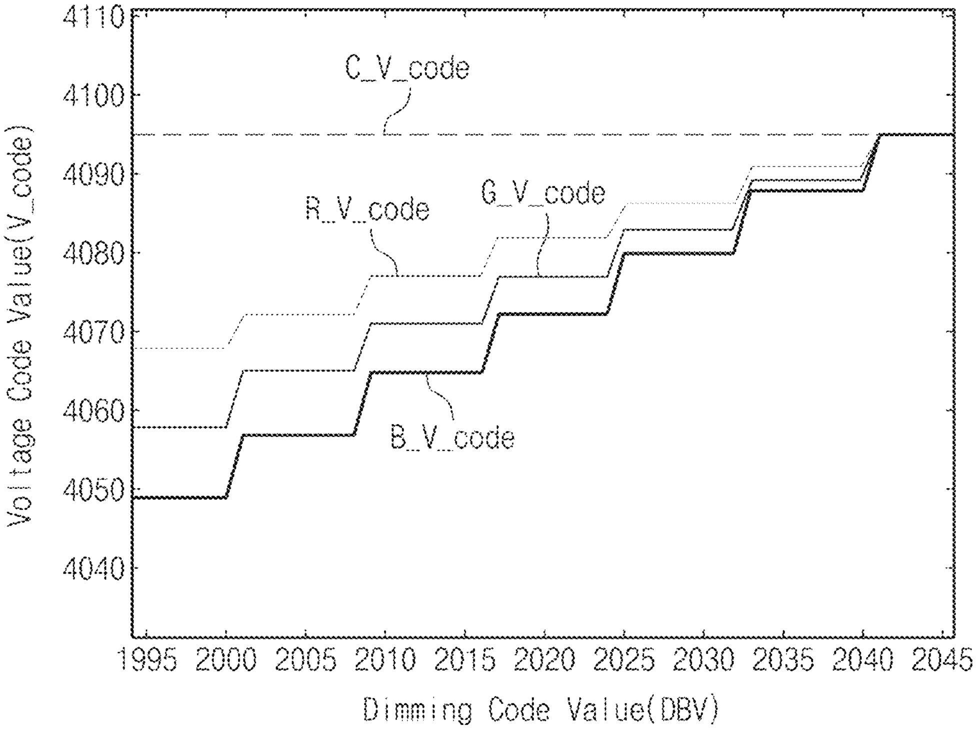
FIG. 5B is a graph illustrating a change in a voltage code value according to a dimming code value for each color.

FIG. 5A is a graph illustrating a change in the output data O_data according to the dimming code value DBV for each color, and FIG. 5B is a graph illustrating a change in the voltage code value V_code according to the dimming code value DBV for each color. First to third graphs R_d1, G_d1, and B_d1 in FIG. 5A illustrate changes in red, green, and blue output data according to a decrease in the dimming code value DBV when a general correction method is applied, and fourth to sixth graphs R_d2, G_d2, and B_d2 in FIG. 5A illustrate changes in red, green, and blue output data according to a decrease in the dimming code value DBV when the correction method according to the disclosure is applied.

According to first to third graphs R_d1, G_d1, and B_d1 of FIG. 5A, when the general correction method is applied to the display device DD (refer to FIG. 1), it is seen that the red, green, and blue output data gradually decreases, as the dimming code value DBV decreases. In detail, as the dimming code value DBV decreases, grayscale loss may occur in each of the red, green, and blue output data.

According to fourth to sixth graphs R_d2, G_d2, and B_d2 of FIG. 5A, even when the dimming code value DBV is decreased, the deviation ΔD (refer to FIDS. 3A and 3B) between the highest dimming grayscale value D_scale and the highest reference grayscale value GC_max may be compared with the reference deviation R_bit, and the voltage code value V_code and the gamma correction values of the gamma correction table GLUT may be updated depending on the comparison result. Accordingly, the red, green, and blue output data output from the gamma correction unit 122 (refer to FIG. 2B) may not decrease below a predetermined value. Even when the dimming code value DBV is decreased, bit loss in each of the red, green, and blue output data may not exceed a reference value ΔD_bit. Accordingly, it is possible to prevent a phenomenon in which display quality is deteriorated due to the bit loss after dimming.

In FIG. 5B, a seventh graph C_V_code indicates red, green, and blue voltage code values when the general correction method is applied. In FIG. 5B, eighth to tenth graphs R_V_code, G_V_code, and B_V_code indicate changes in the red, green, and blue voltage code values when the correction method according to the disclosure is applied.

According to the seventh graph C_V_code of FIG. 5B, when the general correction method is applied to the display device DD (refer to FIG. 1), it is shown that the red, green, and blue voltage code values do not change and maintain uniform values, even when the dimming code value DBV decreases.

However, according to eighth to tenth graphs R_V_code, G_V_code, and B_V_code of FIG. 5B, as the dimming code value DBV decreases, the red, green, and blue voltage code values may be gradually decreased. In an embodiment of the disclosure, the red, green, and blue voltage code values may be code values for determining the voltage level of the first gamma reference voltage for each red, green, and blue.

Accordingly, even when the bit loss occurs in each of the red, green, and blue output data output from the gamma correction unit 122 (refer to FIG. 2B), the bit loss may be compensated for by changing the first gamma reference voltage. Accordingly, it is possible to prevent a phenomenon in which display quality is deteriorated due to bit loss after dimming.

Figure 6A:
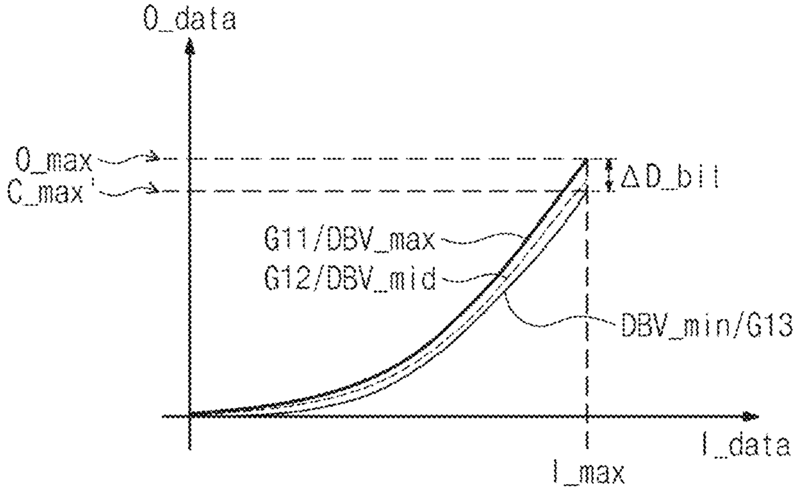
FIG. 6A is a graph illustrating a bit loss of output data when a voltage code value is updated according to a dimming code value.
Figure 6B:
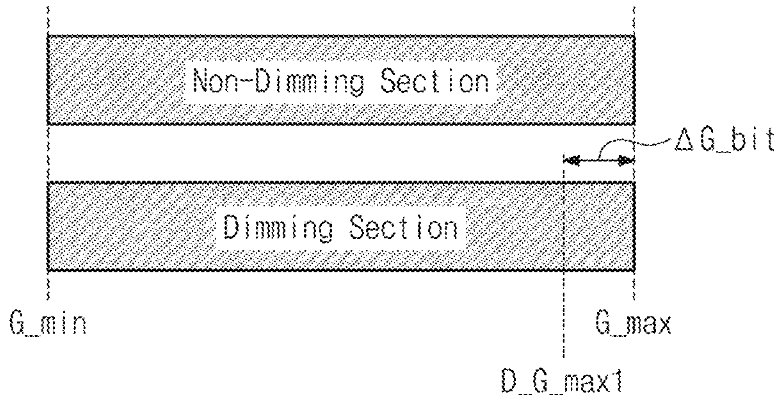
FIG. 6B is a conceptual diagram illustrating a grayscale loss of a data voltage according to a dimming code value when a voltage code value is updated according to a dimming code value.
Figure 7A:
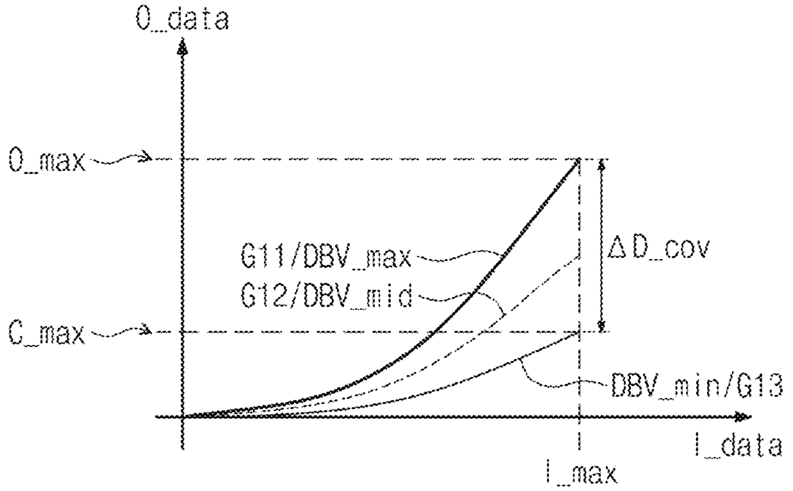
FIG. 7A is a graph illustrating a bit loss of output data according to a dimming code value when a voltage code value is not updated according to a dimming code value.
Figure 7B:
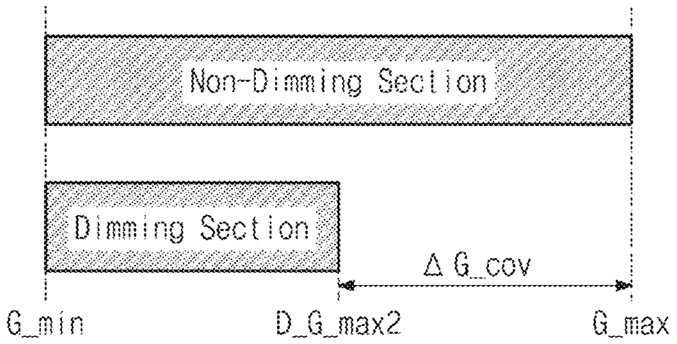
FIG. 7B is a conceptual diagram illustrating a grayscale loss of a data voltage according to a dimming code value when a voltage code value is updated according to a dimming code value.

FIG. 6A is a graph illustrating a bit loss of output data when a voltage code value is updated according to a dimming code value, and FIG. 6B is a conceptual diagram illustrating a grayscale loss of a data voltage according to a dimming code value when a voltage code value is updated according to a dimming code value. FIG. 7A is a graph illustrating a bit loss of output data according to a dimming code value when a voltage code value is not updated according to a dimming code value, and FIG. 7B is a conceptual diagram illustrating a grayscale loss of a data voltage according to a dimming code value when a voltage code value is updated according to a dimming code value. In FIGS. 6A and 7A, an eleventh graph G11 represents the output data O_data with respect to the input data I_data at a highest dimming code value DBV_max, a twelfth graph G12 represents the output data O_data with respect to the input data I_data at an intermediate dimming code value DBV_mid, and a thirteenth graph G13 represents the output data O_data with respect to the input data I_data at a minimum dimming code value DBV_min.

Referring to FIGS. 6A and 7A, the data converter 120 (refer to FIGS. 2A and 2B) may convert the highest input data I_max at the highest dimming code value DBV_max to the highest output data O_max. When dimming code values DBV_mid and DBV_min lower than the highest dimming code value DBV_max are provided to the data converter 120, the highest input data I_max cannot be converted into the highest output data O_max, and are converted into corrected output data C_max having a value lower than the highest output data O_max. When the general correction method is applied to the display device DD (refer to FIG. 1), a first bit loss ΔD_cov may maximally occur between the highest output data O_max and the corrected output data C_max.

However, when the correction method according to the disclosure is applied to the display device (DD, refer to FIG. 1), a second bit loss ΔD_bit may maximally occur between the highest output data O_max and the corrected output data C_max'. The second bit loss ΔD_bit may be less than the first bit loss ΔD_cov.

Referring to FIGS. 6B and 7B, when grayscales expressed by the data voltage in a non-dimming section are '0' to 255 grayscales, a lowest grayscale G min may be '0' grayscale, and a highest grayscale G_max may be 255 grayscale. In the dimming section, when the general correction method is applied to the display device DD (refer to FIG. 1), and when the first bit loss Δd_cov between the highest output data O_max (refer to FIG. 7A) and the corrected output data C_max (refer to FIG. 7A) occurs, the first grayscale loss ΔG_cov may occur at the highest data voltage. That is, due to the first grayscale loss ΔG_cov, the highest grayscale that the actual maximum data voltage may express may be reduced to "D_G_max2".

However, in the dimming section, when the correction method according to the disclosure is applied to the display device DD (refer to FIG. 1), the second bit loss Δd_bit (refer to FIG. 6B) may maximally occur between the highest output data O_max (refer to FIG. 6A) and the corrected output data C_max' (refer to FIG. 6A). Since the second bit loss ΔD_bit is less than the first bit loss ΔD_cov, a second grayscale loss ΔG_bit less than the first grayscale loss ΔG_cov may occur at the highest data voltage DV_max (refer to Equation 5) or a grayscale loss may not occur at all at the highest data voltage DV_max (refer to Equation 5). That is, even after dimming, the highest grayscale that the actual maximum data voltage DV_max may express may not decrease to below "D_G_max1". Accordingly, it is possible to prevent a phenomenon in which display quality is deteriorated due to bit loss after dimming.

Figure 8:
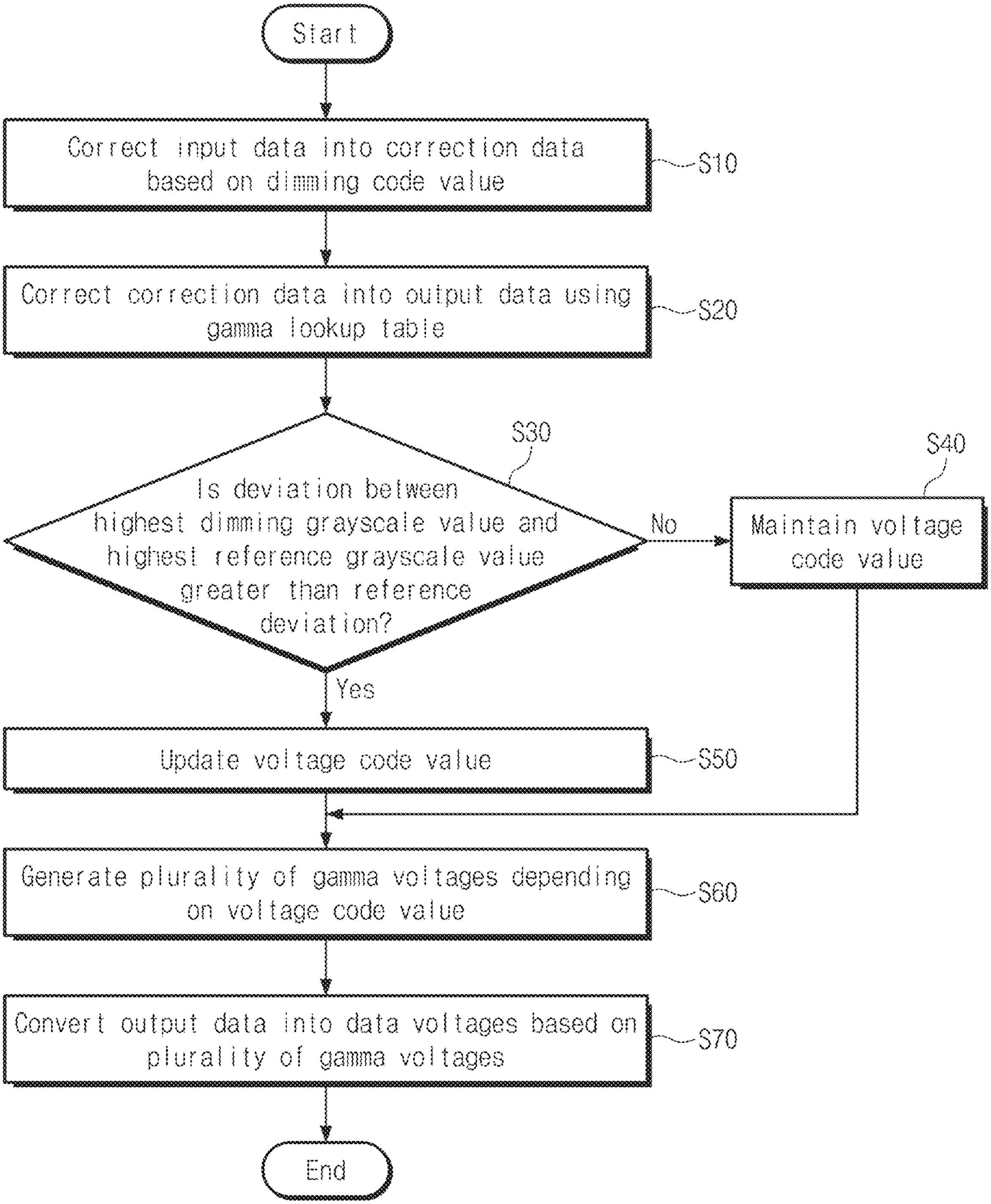
FIG. 8 is a flowchart illustrating an embodiment of a method of driving a display device, according to the disclosure.

FIG. 8 is a flowchart illustrating an embodiment of a method of driving a display device, according to the disclosure.

Referring to FIGS. 2A, 2B, 3A, 3B, and 8, according to the driving method of the display device, the luminance correction unit 121 may correct the input data I_data based on the dimming code value DBV, and may output the correction data C_data (S10). Thereafter, the gamma correction unit 122 may generate the output data O_data by correcting the correction data C_data to correspond to the reference gamma using the gamma lookup table GLUT (S20).

The controller 110 may compare the highest dimming grayscale value D_scale determined by the dimming code value DBV with the highest reference grayscale value GC_max of the gamma lookup table GLUT (S30). In detail, the controller 110 may determine whether the deviation ΔD between the highest dimming grayscale value D_scale and the highest reference grayscale value GC_max is greater than a preset reference deviation.

Thereafter, the controller 110 may determine whether to update the first voltage code value with the second voltage code value depending on the comparison result. When the deviation ΔD between the highest dimming grayscale value D_scale and the highest reference grayscale value GC_max is less than or equal to the reference deviation, the first voltage code value may be maintained without updating (S40). In contrast, when the deviation ΔD between the highest dimming grayscale value D_scale and the highest reference grayscale value GC_max is greater than the reference deviation, the first voltage code value may be updated with the second voltage code value (S50).

Thereafter, the gamma voltage generator 130 may generate the plurality of gamma voltages V_GMMA depending on the first voltage code value or the second voltage code value (S60). Subsequently, the data driver 200 may convert the output data O_data into the data voltages DV1 to DVm based on the plurality of gamma voltages V_GMMA and may provide the converted data voltages to the display panel DP (refer to FIG. 1) (S70).

The highest dimming grayscale value D_scale may be determined by Equation 3, and the reference deviation may be determined by Equation 1 or Equation 2. The second voltage code value may be determined according to the target reference voltage calculated by Equation 4. Descriptions of the highest dimming grayscale value D_scale, the reference deviation, and the target reference voltage will be omitted to avoid redundancy.

Figure 9:
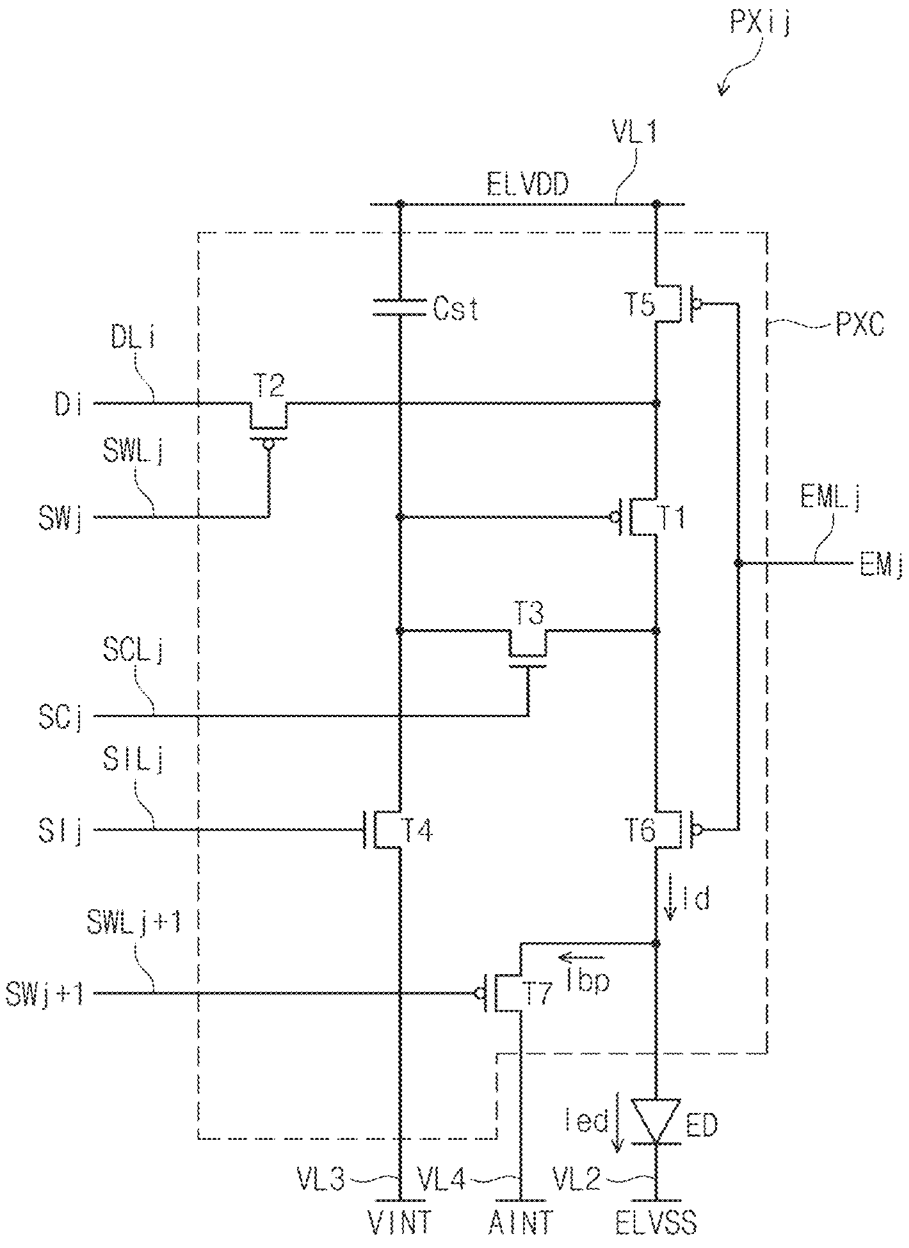
FIG. 9 is a circuit diagram of an embodiment of a pixel, according to the disclosure.
Figure 10:
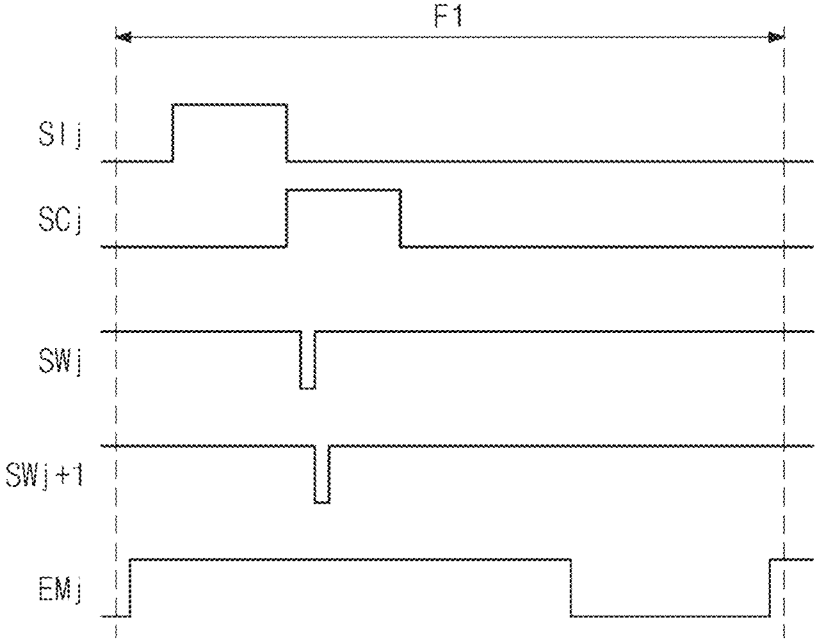
FIG. 10 is a timing diagram for describing an embodiment of an operation of a pixel illustrated in FIG. 9, according to the disclosure.

FIG. 9 is a circuit diagram of an embodiment of a pixel, according to the disclosure. FIG. 10 is a timing diagram for describing an embodiment of an operation of a pixel illustrated in FIG. 9, according to the disclosure.

FIG. 9 illustrates an equivalent circuit diagram of one pixel PXij among the plurality of pixels illustrated in FIG. 1. Here, i and j are natural numbers. Since each of the plurality of pixels has the same circuit structure, only the circuit structure of the pixel PXij will be described, and additional descriptions of the remaining pixels will be omitted to avoid redundancy. The pixel PXij is connected to an i-th data line DLi (hereinafter also referred to as a data line) among the data lines DL1 to DLm and a j-th emission control line EMLj (hereinafter also referred to as an emission control line) among the emission control lines EML1 to EMLn. The pixel PXij is connected to a j-th initialization scan line SILj (hereinafter also referred to as an initialization scan line) among the initialization scan lines SIL1 to SILn, a j-th write scan line SWLj (hereinafter also referred to as a first write scan line) among the write scan lines SWL1 to SWLn+1, and a (j+1)-th write scan line SWLj+1 (hereinafter also referred to as a second write scan line) among the write scan lines SWL1 to SWLn+1. Also, the pixel PXij is connected to a j-th compensation scan line SCLj (hereinafter also referred to as a compensation scan line) among the compensation scan lines SCL1 to SCLn. In an alternative embodiment, the pixel PXij may be connected to a separate j-th black scan line instead of the (j+1)-th write scan line SWLj+1.

The pixel PXij includes the light-emitting device ED and the pixel circuit PXC. The light-emitting device ED may include a light-emitting diode. The light-emitting diode may include an organic light-emitting material, an inorganic light-emitting material, quantum dots, and quantum rods as the light-emitting layer.

The pixel circuit PXC includes first to seventh transistors T1, T2, T3, T4, T5, T6, and T7 and one capacitor Cst. Each of the first to seventh transistors T1 to T7 may be a transistor having a low-temperature polycrystalline silicon ("LTPS") semiconductor layer. Some of the first to seventh transistors T1 to T7 may be P-type transistors, and some of the rest may be N-type transistors. In an embodiment, among the first to seventh transistors T1 to T7, the first, second, and fifth to seventh transistors T1, T2, and T5 to T7 may be P-type transistors, and the third and fourth transistors T3 and T4 may be N-type transistors using an oxide semiconductor as the semiconductor layer, for example. However, the configuration of the pixel circuit PXC according to the disclosure is not limited to the embodiment illustrated in FIG. 9. The pixel circuit PXC illustrated in FIG. 9 is only an example, and the configuration of the pixel circuit PXC may be modified and implemented. In an embodiment, all of the first to seventh transistors T1 to T7 may be P-type transistors or N-type transistors, for example. In another embodiment, the number of the transistors may be greater than or less than seven and the number of the capacitor may be greater than one.

The initialization scan line SILj, the compensation scan line SCLj, the first and second write scan lines SWLj and SWLj+1, and the emission control line EMLj may transfer a j-th initialization scan signal SIj (hereinafter, also referred to as an initialization scan signal), a j-th compensation scan signal SCj (hereinafter, also referred to as a compensation scan signal), a j-th and (j+1)-th write scan signals SWj and Swj+1 (hereinafter, also referred to as first and second write scan signals), and a j-th light emission control signal EMj (hereinafter, also referred to as a light emission control signal), respectively, to the pixel PXij. The data line DLi transfers the data signal Di to the pixel Pxij. The data signal Di may have a voltage level corresponding to the grayscale of corresponding input image signal among the input image signals RGB input to the display device DD (refer to FIG. 1). First to fourth driving voltage lines VL1, VL2, VL3, and VL4 may transfer the first driving voltage ELVDD, the second driving voltage ELVSS, the first initialization voltage VINT, and the second initialization voltage AINT, respectively.

The first transistor T1 includes a first electrode connected to the first driving voltage line VL1 through the fifth transistor T5, a second electrode electrically connected to an anode of the light-emitting device ED through the sixth transistor T6, and a gate electrode connected to one end of the capacitor Cst. The first transistor T1 may receive the data signal Di transferred by the data line DLi depending on the switching operation of the second transistor T2 and then may supply a driving current Id to the light-emitting device ED.

The second transistor T2 includes a first electrode connected to the data line DLi, a second electrode connected to the first electrode of the first transistor T1, and a gate electrode connected to the first write scan line SWLj. The second transistor T2 may be turned on depending on the first write scan signal SWj received through the first write scan line SWLj and then may transfer the data signal Di transferred from the data line DLi to the first electrode of the first transistor T1.

The third transistor T3 includes a first electrode connected to a second electrode of the first transistor T1, a second electrode connected to the gate electrode of the first transistor T1, and a gate electrode connected to the compensation scan line SCLj. The third transistor T3 may be turned on depending on the compensation scan signal SCj received through the compensation scan line SCLj, and thus, the gate electrode and the second electrode of the first transistor T1 may be connected to each other such that the first transistor T1 may be diode-connected.

The fourth transistor T4 includes a first electrode connected to the gate electrode of the first transistor T1, a second electrode connected to a third voltage line VL3 to which the first initialization voltage VINT is transferred, and a gate electrode connected to the initialization scan line SILj. The fourth transistor T4 may be turned on depending on the initialization scan signal SIj received through the initialization scan line SILj and then may perform an initialization operation of initializing a voltage of the gate electrode of the first transistor T1 by transferring the first initialization voltage VINT to the gate electrode of the first transistor T1.

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light-emitting device ED, and a gate electrode connected to the emission control line EMLj.

The fifth transistor T5 and the sixth transistor T6 are simultaneously turned on depending on the light emission control signal EMj received through the emission control line EMLj. The first driving voltage ELVDD applied through the turned-on fifth transistor T5 may be compensated through the diode-connected first transistor T1 and then may be transferred to the light-emitting device ED.

The seventh transistor T7 includes a first electrode connected to the second electrode of the sixth transistor T6, a second electrode connected to a fourth voltage line VL4 to which the second initialization voltage AINT is transferred, and a gate electrode connected to the second write scan line SWLj+1.

As described above, one end of the capacitor Cst is connected to the gate electrode of the first transistor T1, and the other end of the capacitor Cst is connected to the first driving voltage line VL1. A cathode of the light-emitting device ED may be connected to a second driving voltage line VL2 that transfers the second driving voltage ELVS S.

Referring to FIGS. 9 and 10, when the initialization scan signal SIj of a high level is provided through the initialization scan line SILj during the initialization period of one frame F1, the fourth transistor T4 is turned on in response to the initialization scan signal SIj of the high level. The first initialization voltage VINT is transferred to the gate electrode of the first transistor T1 through the turned-on fourth transistor T4, and a voltage level of the gate electrode of the first transistor T1 is initialized to the first initialization voltage VINT.

Next, when the compensation scan signal SCj of a high level is supplied through the compensation scan line SCLj during the compensation period of the one frame F1, the third transistor T3 is turned on. The compensation period may not overlap the initialization period. An activation period of the compensation scan signal SCj is defined as a period in which the compensation scan signal SCj has a high level, and an activation period of the initialization scan signal SIj is defined as a period in which the initialization scan signal SIj has a high level. The activation period of the compensation scan signal SCj may not overlap with the activation period of the initialization scan signal SIj. The activation period of the initialization scan signal SIj may precede the activation period of the compensation scan signal SCj.

During the compensation period, the first transistor T1 is diode-connected by the turned-on third transistor T3 and is forward biased. Also, the compensation period may include a data writing period in which the first write scan signal SWj is generated with a low level. During the data writing period, the second transistor T2 is turned on by the low-level first write scan signal Swj. Accordingly, a compensation voltage Di-Vth, which is obtained by reducing the voltage of the data signal Di supplied from the data line DLi by a threshold voltage Vth of the first transistor T1, is applied to the gate electrode of the first transistor T1. That is, a potential of the gate electrode of the first transistor T1 may be the compensation voltage Di-Vth.

The first driving voltage ELVDD and the compensation voltage Di-Vth may be applied to opposite ends of the capacitor Cst, and charges corresponding to a voltage difference between the opposite ends may be stored in the capacitor Cst.

The seventh transistor T7 is turned on by receiving the low-level second write scan signal SWj+1 through the second write scan line SWLj+1. Some of the driving current Id may be drained through the seventh transistor T7 as a bypass current Ibp.

When the pixel PXij displays a black image, even though the minimum driving current of the first transistor T1 flows as the driving current Id, the pixel PXij cannot normally display the black image when the light-emitting device ED emits light. Accordingly, the seventh transistor T7 in the pixel PXij in an embodiment of the disclosure may distribute a portion of the minimum current of the first transistor T1 to a current path other than the current path toward the light-emitting device ED, as the bypass current Ibp. In this case, the minimum current of the first transistor T1 means a current flowing into the first transistor T1 under the condition that a gate-source voltage of the first transistor T1 is less than the threshold voltage such that the first transistor T1 is turned off. In this way, under the condition that the first transistor T1 is turned off, the minimum driving current (e.g., current of about 10 picoamperes (pA) or less) flowing into the first transistor T1 is transferred to the light-emitting device ED, and a black grayscale image is displayed. When the pixel PXij displays the black image, while the effect of the bypass current Ibp on the minimum drive current is relatively large, when the pixel PXij displays an image such as a normal image or a white image, there is little influence of the bypass current Ibp on the driving current Id. Accordingly, when the black image is displayed, a current (i.e., a light emission current led) reduced by the amount of the bypass current Ibp exiting through the seventh transistor T7 from the drive current Id is provided to the light-emitting device ED, and then the black image may be clearly expressed. Accordingly, the pixel PXij may implement an accurate black grayscale image using the seventh transistor T7, and as a result, a contrast ratio may be improved.

Next, the light emission control signal EMj supplied from the emission control line EMLj is changed from a high level to a low level. The fifth transistor T5 and the sixth transistor T6 are turned on by the light emission control signal EMj of a low level. Accordingly, the driving current Id is generated depending on a voltage difference between the gate voltage of the gate electrode of the first transistor T1 and the first driving voltage ELVDD and is supplied to the light-emitting device ED through the sixth transistor T6, and the current Ted flows through the light-emitting device ED.

According to an embodiment of the disclosure, even when a dimming code value is decreased, the deviation between the highest dimming grayscale value and the preset highest reference grayscale value may be compared with the preset reference deviation, and the voltage code value may be updated depending on the comparison result.

Accordingly, the output data output from the gamma correction unit may not decrease below a predetermined value, and as a result, bit loss occurring in the output data may be minimized. Accordingly, it is possible to prevent a phenomenon in which display quality is deteriorated due to bit loss after dimming.

Although an embodiment of the disclosure has been described for illustrative purposes, those skilled in the art will appreciate that various modifications, and substitutions are possible, without departing from the scope and spirit of the disclosure as disclosed in the accompanying claims. In addition, the embodiments disclosed in the disclosure are not intended to limit the technical spirit of the disclosure, and all technical ideas within the scope of the following claims and their equivalents should be construed as being included in the scope of the disclosure.

What is claimed is:

1. A display device comprising:

a display panel which displays an image;

a luminance correction unit which corrects input data based on a dimming code value and outputs correction data;

a gamma correction unit which corrects the correction data to correspond to a reference gamma using a gamma lookup table and generates output data;

a gamma voltage generator which generates a plurality of gamma voltages depending on a first voltage code value;

a data driver which converts the output data into data voltages based on the plurality of gamma voltages and provides converted data voltages to the display panel; and a controller which supplies the dimming code value and the input data to the luminance correction unit, provides the first voltage code value to the gamma voltage generator, and controls driving of the data driver, and wherein the controller compares a highest dimming grayscale value of the output data determined by the dimming code value with a preset highest reference grayscale value, and updates the first voltage code value with a second voltage code value.

2. The display device of claim 1, wherein the controller determines whether to update the first voltage code value by determining whether a deviation between the highest dimming grayscale value and the preset highest reference grayscale value is greater than a preset reference deviation.

3. The display device of claim 2, wherein the controller:

updates the first voltage code value to the second voltage code value when the deviation between the highest dimming grayscale value and the preset highest reference grayscale value is greater than the preset reference deviation, and maintains the first voltage code value when the deviation between the highest dimming grayscale value and the preset highest reference grayscale value is equal to or less than the preset reference deviation.

4. The display device of claim 2, wherein the preset reference deviation satisfies Equation of $R\_bit=2^{n-m}$, where R_bit is the preset reference deviation, 'n' is a number of bits of each of the output data, and 'm' is a number of bits of each of the input data.

5. The display device of claim 2, wherein the preset reference deviation satisfies Equation of $R\_bit'=2^{n-m}$, where R_bit' is the preset reference deviation, and 'n' is a number of bits of each of the output data.

6. The display device of claim 1, wherein the highest dimming grayscale value satisfies Equation of $D\_scale=GC\_max(DBV/M\_DBV)^{(1/R\_G)}$, where D_scale is the highest dimming grayscale value, GC_max is the preset highest reference grayscale value, DBV is the dimming code value, M_DBV is a highest dimming code value, and R_G is the reference gamma, and wherein, the preset highest reference grayscale value is the highest dimming grayscale value of the output data determined by the highest dimming code value.

7. The display device of claim 1, wherein the gamma voltage generator updates one of a first gamma reference voltage and a second gamma reference voltage serving as a reference of the plurality of gamma voltages, based on the second voltage code value.

8. The display device of claim 7, wherein the controller updates the first gamma reference voltage with a target reference voltage calculated such that a highest data voltage corresponding to the highest dimming grayscale value is the same as the highest data voltage corresponding to the preset highest reference grayscale value.

9. The display device of claim 8, wherein the controller:

updates the first voltage code value with the second voltage code value based on the target reference voltage, and provides an updated second voltage code value to the gamma voltage generator.

10. The display device of claim 8, wherein the gamma correction unit adjusts the output data by updating a gamma correction value of the gamma lookup table based on the target reference voltage.

11. A driving method of a display device, the method comprising:

correcting input data based on a dimming code value to output correction data;

correcting the correction data to correspond to a reference gamma using a gamma lookup table to generate output data;

comparing a highest dimming grayscale value of the output data determined by the dimming code value with a preset highest reference grayscale value;

determining whether to update a first voltage code value with a second voltage code value depending on a comparison result;

generating a plurality of gamma voltages based on the first voltage code value or the second voltage code value; and converting the output data into data voltages based on the plurality of gamma voltages and providing the converted data voltages to a display panel.

12. The driving method of the display device of claim 11, wherein the comparing the highest dimming grayscale value with the preset highest reference grayscale value includes:

determining whether a deviation between the highest dimming grayscale value and the preset highest reference grayscale value is greater than a preset reference deviation.

13. The driving method of the display device of claim 12, wherein the determining whether to update the first voltage code value with the second voltage code value depending on the comparison result includes:

updating the first voltage code value to the second voltage code value when the deviation between the highest dimming grayscale value and the preset highest reference grayscale value is greater than the preset reference deviation, and maintaining the first voltage code value without updating when the deviation between the highest dimming grayscale value and the preset highest reference grayscale value is equal to or less than the preset reference deviation.

14. The driving method of the display device of claim 12, wherein the preset reference deviation satisfies Equation of $R\_bit=2^{n-m}$, where R_bit is the preset reference deviation, 'n' is a number of bits of each of the output data, and 'm' is a number of bits of each of the input data.

15. The driving method of the display device of claim 12, wherein the preset reference deviation satisfies Equation of $R\_bit'=2^{n-m}$, where R_bit' is the preset reference deviation, and 'n' is a number of bits of each of the output data.

16. The display device of claim 11, wherein the highest dimming grayscale value satisfies Equation of $D\_scale=GC\_max(DBV/M\_DBV)^{(1/R\_G)}$, where, D_scale is the highest dimming grayscale value, GC_max is the preset highest reference grayscale value, DBV is the dimming code value, M_DBV is a highest dimming code value, and R_G is the reference gamma, and wherein, the preset highest reference grayscale value is the highest dimming grayscale value of the output data determined by the highest dimming code value.

17. The driving method of the display device of claim 11, wherein a first gamma reference voltage and a second gamma reference voltage are provided to generate the plurality of gamma voltages, and wherein a voltage level of the first gamma reference voltage is determined by the first voltage code value.

18. The driving method of the display device of claim 17, wherein the determining whether to update the first voltage code value with the second voltage code value depending on the comparison result includes:

updating the first gamma reference voltage with a target reference voltage calculated such that a highest data voltage corresponding to the highest dimming grayscale value is the same as the highest data voltage corresponding to the preset highest reference grayscale value.

19. The driving method of the display device of claim 18, wherein the determining whether to update the first voltage code value with the second voltage code value depending on the comparison result further includes:

updating the first voltage code value with the second voltage code value based on the target reference voltage, and wherein the generating the plurality of gamma voltages includes:

generating the plurality of gamma voltages using an updated second voltage code value.

20. The driving method of the display device of claim 18, further comprising:

adjusting the output data by updating a gamma correction value of the gamma lookup table based on the target reference voltage.

* * * * *